Patented June 22, 1926.

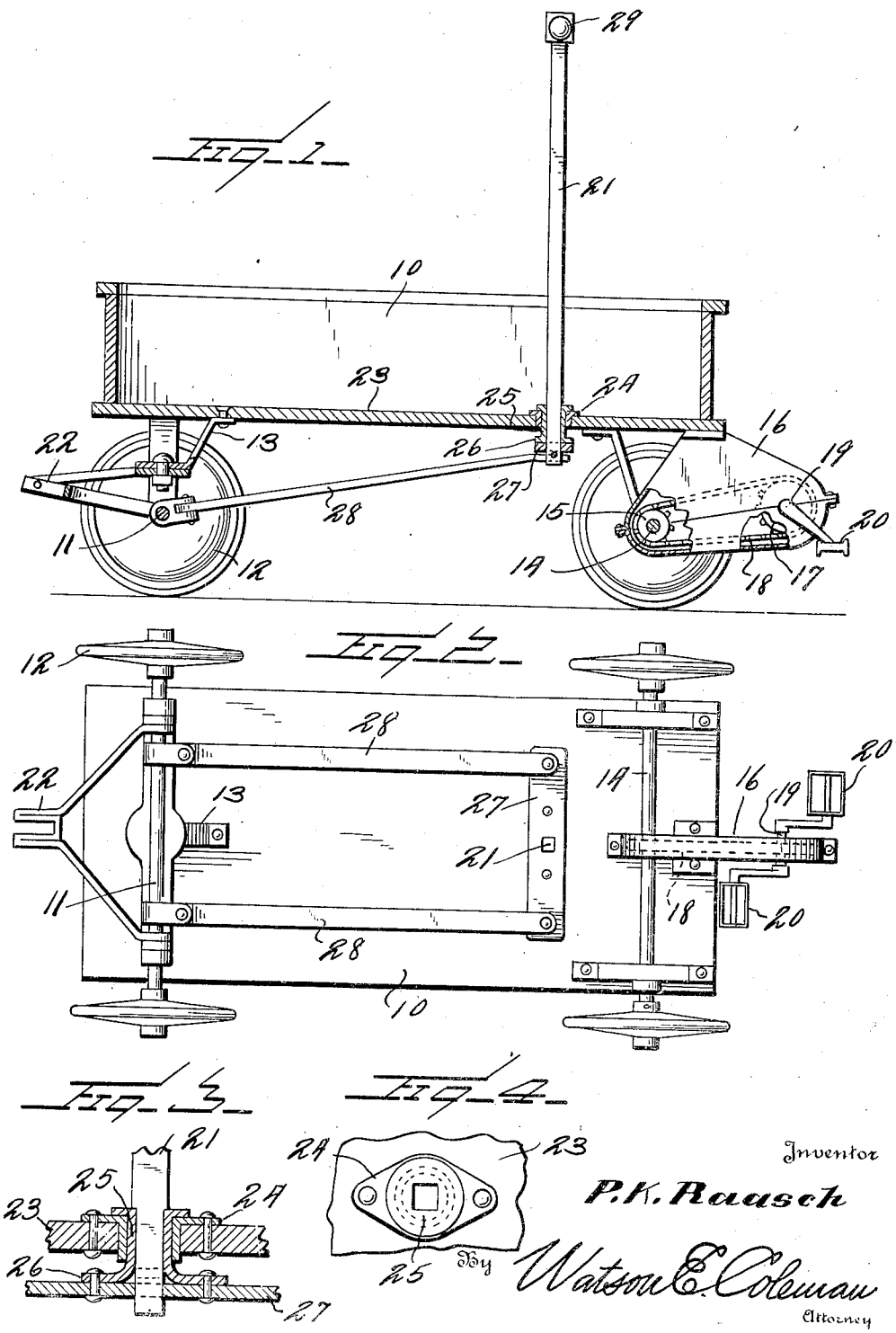

1,590,057

UNITED STATES PATENT OFFICE.

PAUL K. RAASCH, OF EAST AKRON, OHIO.

COASTER WAGON.

Application filed December 15, 1925. Serial No. 75,592.

This invention relates to coaster wagons such as are used by children and the general object of the invention is to provide a coaster wagon which may be either operated in the usual manner or may be operated by treadles or pedals disposed at the rear end of the coaster wagon so that the boy while operating or driving the wagon may be in convenient position for stepping off the wagon to deliver newspapers, groceries or the like.

A further object of the invention is to provide a coaster wagon with a tongue and means so arranged that the tongue may be either attached to the forward end of the wagon so that it may be pulled in the usual manner or the tongue may be detached and disposed through the bottom of the wagon adjacent the rear end thereof and operatively engaged with the front wheels so as to steer the wagon from the rear as the boy is operating the pedals.

Other objects will appear in the course of the following description.

My invention is illustrated in the accompanying drawings wherein:—

Figure 1 is a longitudinal section of a wagon constructed in accordance with my invention;

Figure 2 is a bottom plan view thereof;

Figure 3 is a fragmentary vertical section through the bottom of the wagon and through the sleeve;

Figure 4 is a fragmentary top plan view of the wagon body and sleeve;

Referring to these drawings it will be seen that I have illustrated an ordinary coaster wagon such as used by youngsters and having a body 10, the front axle 11, the front wheels 12 and the usual bolster 13. The rear axle 14 is mounted in suitable bearings upon the rear of the body and carries upon it the pinion 15. Also mounted at the rear of the wagon, rearward of the rear axle is a housing or other supporting member 16 having therein a sprocket wheel 17 which is engaged with the pinion 15 by means of the sprocket chain 18. The sprocket wheel 17 is mounted upon a shaft 19 which extends through the the housing 16 and carries upon it the crank arms or pedals 20. It will be seen that these pedals are disposed very close to the rear of the rear end of the body 10 so that the operator may stand upon these pedals and then by shifting his weight from one leg to the other operate the pedals and drive the wagon. Of course, I do not wish to be limited to any particular ratio between the sprocket wheel 17 and the sprocket pinion 15 nor do I wish to be limited to the use of a sprocket chain for transmitting motion from the crank shaft 19 to the rear axle.

The tongue 21 is adapted to be connected to the forwardly projecting clevis 22 on the forward end of the wagon in the usual manner, or this tongue may be removed therefrom by simply removing a bolt or like device operatively connected to the steering shaft adjacent the rear end of the wagon. I have illustrated for this purpose the floor 23 of the wagon box 10 as having an aperture through it and has a supporting plate 24 bolted to the floor of the wagon box and having a central aperture. Operating in the aperture in the floor and plate is a thimble or sleeve 25 the upper end of which is flanged over the plate 24 and the lower end of which is flared outward and downward as at 26 and bolted, riveted or otherwise attached to an arm 27, the opposite ends of which are connected by links 28 to the steering axle 11 on opposite sides of the center thereof. The aperture in the thimble or sleeve 25 is rectangular in cross section so that the lower end of the tongue will engage in this aperture and when the tongue is oscillated around this longitudinal axis it will, of course, oscillate the thimble or sleeve and oscillate the steering axle. The upper end of the tongue is, of course, provided with a cross piece 29 by which the tongue may be oscillated. Preferably though not necessarily, one of the wheels on the rear axle will be loose upon the rear axle and the other fast to constitute a driving wheel, but I do not wish to be limited to this, however. While I have illustrated a crank shaft provided with pedals for the purpose of driving the wagon, I do not wish to be limited to the use of pedals mounted directly upon the crank shaft. In this construction the operator stands upon the pedals and by shifting his weight from one to another can drive the wagon forward at quite a fast speed and of course if this is not desired the operator can engage the tongue with the clevis 22 and pull the wagon or kneel within the wagon and push with one leg as is usually done in coaster wagons. By providing a wagon with this driving attachment it very greatly increases the range of usefulness of the coaster wagon inasmuch as it may be operated at a relatively high speed and under load without the necessity of the operator climbing into the wagon or climbing out thereof.

I claim:—

1. A coaster wagon of the character described having front steering wheels and a tongue at the forward end of the wagon and detachably connected therewith, and a member mounted upon the bottom of the wagon and operatively connected with the front axle to shift the wheels, said member being hollow and extending up through the bottom of the wagon whereby the tongue may be disconnected from the front axle at the front of the wagon and engage with said member.

2. A coaster wagon of the character described having a pivoted front axle and wheels thereon, a rear axle, a sleeve rotatably mounted in the bottom of the wagon, a lever mounted upon said sleeve for oscillation therewith and operatively connected to the front axle, and a tongue detachably connected with the forward end of the wagon but when detached operatively engageable with said sleeve to oscillate the same.

3. In a coaster wagon a body, a pivoted front axle having wheels, a rear axle having wheels, a sleeve rotatably mounted in the bottom of the wagon body, a lever attached to said sleeve, links at the extremities connected to the front axle, a tongue detachably connected to the front axle and normally disposed at the forward end of the wagon, the sleeve having a socket to receive the lower end of said tongue when the latter is inserted in said socket.

In testimony whereof I hereunto affix my signature.

PAUL K. RAASCH.